Dec. 15, 1964 R. S. KARBO 3,161,297
MOUNTING BRACKET FOR A VEHICLE ARTICLE
Filed June 3, 1963
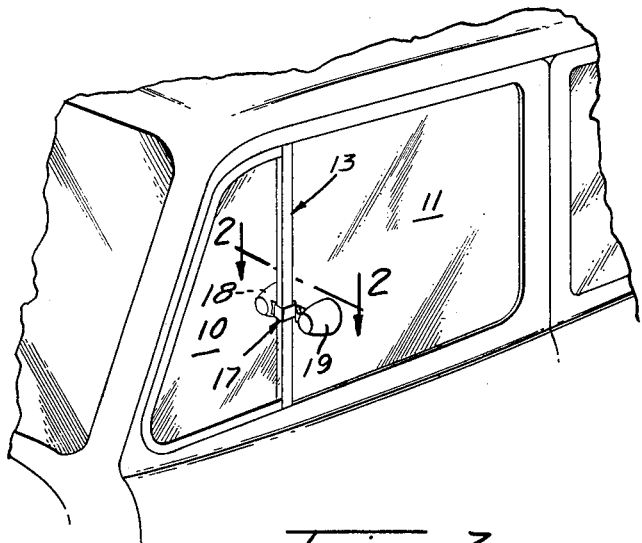
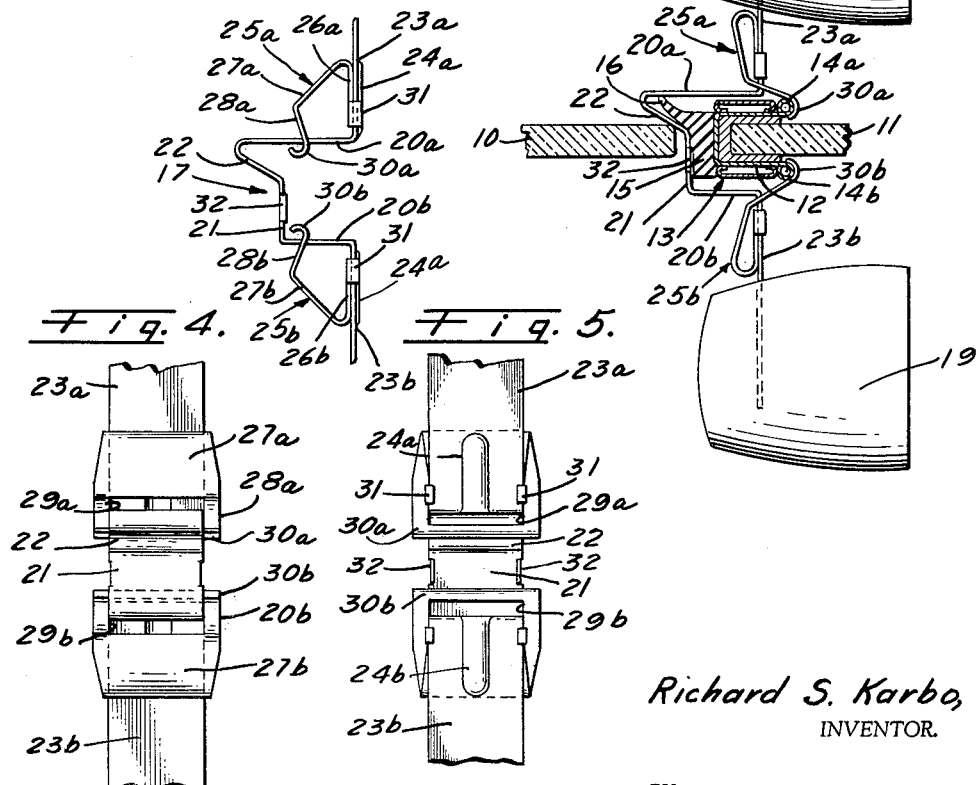
Richard S. Karbo,
INVENTOR.
BY Robert M. McManigal
Attorney

United States Patent Office 3,161,297
Patented Dec. 15, 1964

3,161,297
MOUNTING BRACKET FOR A VEHICLE ARTICLE
Richard S. Karbo, Whittier, Calif., assignor to Sutone Corporation, Paramount, Calif., a corporation of California
Filed June 3, 1963, Ser. No. 284,983
6 Claims. (Cl. 211—87)

The present invention relates generally to a mounting bracket or support, and is more particularly concerned with means for attaching an article or articles to a part of a vehicle.

In accordance with the broad concepts of the invention it is one object to provide an article mounting bracket which can be attached to a vehicle part without the use of tools, and which will support the article in a desired position without interfering in any way with the usual function of the vehicle part.

A further object of the invention is to provide a mounting bracket of the character described which may be utilized without modification for right and left hand installations, and for supporting inside or outside as desired various types of articles such as mirrors, instruments, sunshades and other devices on the mullion bar structure of an automobile window frame.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a fragmentary perspective view of a motor vehicle, showing the manner in which the mounting bracket of the present invention is utilized;

FIG. 2 is a transverse sectional view taken through the mullion bar of an automobile window frame, taken substantially on line 2—2 of FIG. 1, and showing the mounting bracket of the present invention with its parts in attaching position;

FIG. 3 is a fragmentary top plan view of the mounting bracket, the parts being in non-attaching position;

FIG. 4 is a fragmentary back elevational view thereof; and

FIG. 5 is a fragmentary front elevational view.

Referring now is detail to the accompanying drawings, for illustrative purposes, the invention is disclosed as being mounted on a motor vehicle in connection with the front side windows, which in this case consist of a conventional swingable ventilating wing section 10 and an associated vertical moving main side window section 11.

In the conventional arrangement of such window sections, the forward vertical edge of the main window section is slidable within a fixed mullion channel member 12 of a mullion bar structure 13, the channel having beaded edges 14a and 14b. As usually constructed, the channel on its bridging portion carries a weather strip 15 of rubber or other suitable material having a projecting side lip 16 which is adapted to be engaged by the adjacent edge of the swingable window section, when it is moved to closed position.

Broadly, the present invention embodies a fabricated bracket structure, as generally indicated at 17, which is arranged as will hereinafter be explained in detail, to be attached to the mullion bar structure 13 in such a way as to support an associated article or articles, in this instance being illustrated by the casings 18 and 19 which in their mounted position are respectively disposed inwardly and outwardly of the windows.

Referring more specifically to FIG. 3, the bracket structure is shown as comprising a single piece of strap material such as stainless steel or other appropriate rigid material which is bent or otherwise formed to provide a U-shaped portion having spaced apart side legs 20a and 20b which are interconnected by a bridging portion of irregular configuration consisting of a right angled portion 21 and an inclined or angularly extending portion 22. It will be observed that the U-shaped portion of the bracket, as shown in FIG. 2, is adapted to conform to the mullion channel and associated weather strip in such a manner that there will be no interference with the functioning of the window sections or associated parts.

The legs 20a and 20b are integrally formed with outwardly extending arms 23a and 23b which extend in opposite directions and may be of any desired length and arranged in any manner for attachment to the article which is to be supported thereon. If desired, the arms at their junction with the associated legs of the U-shaped portion may be constructed with deformed surfaces to provide strengthening ribs 24a and 24b, respectively.

On opposite sides of the U-shaped portion, there are provided resilient clamping finger structures as indicated by the numerals 25a and 25b which coact with the U-shaped portion to retain the mounting bracket in mounted position on the associated mullion bar 13. The finger structure is in each case fabricated from a flat strip of material which is deformed to provide a generally V-shape in which parts 26a and 26b respectively extend at an angle to parts 27a and 27b. At their outmost end portions, the parts 27a and 27b are inwardly deflected to form extensions 28a and 28b in each case, these extensions being of greater width than the adjacent leg of the U-shaped portion, and containing transversely extending slots 29a and 29b which are adapted to receive the adjacent legs therethrough. These slots permit limited deflecting movement of the parts 27a and 27b of the clamping finger structures. The extension termini are provided in each case with a hooked or turned end edge 30a–30b which are respectively adapted to hook over the beaded edges 14a and 14b of the mullion channel, when the bracket is in mounted position thereon. The finger structures are anchored to their associated arms in each case by means of bendable lateral tabs 31—31 integrally formed with the part 26a or 26b in each case.

If desired, the portion 21 of the bridging portion may be provided with edge projections 32—32 to aid in holding the bracket against displacement with respect to the engaged weather strip.

From a consideration of the drawings and with the aid of the description, it is believed that the manner of mounting the bracket of the present invention in operative position will be clearly appreciated and understood, without further explanation. It will be appreciated that no tools are required and that the manner in which the bracket is fastened permits height adjustments along the mullion bar to meet the desires of different individuals, and when so affixed to the mullion bar structure will support the article or articles in the desired position without interfering in any manner with the function of the vehicle parts.

Various modifications may suggest themselves to those skilled in the art without departing from the spirit of my invention, and hence, I do not wish to be restricted to the specific form shown or uses mentioned, except to the extent indicated in the appended claims.

I claim:
1. An article mounting bracket, comprising:
   (a) a strap member formed to provide a U-shaped portion having spaced side legs interconnected by a bridging portion;
   (b) an integral arm portion formed by the strap projecting in right angled relation from each of said side legs; and

(c) resilient spring finger members respectively on opposite sides of said U-shaped portion, said finger members having anchored ends positioned laterally outwardly on said arms, and deflectable free ends extending toward the U-shaped portion between said legs.

2. An article mounting bracket, comprising:
(a) a strap member formed to provide a U-shaped portion having spaced side legs interconnected by a bridging portion;
(b) integral arm portions respectively formed by the strap projecting in right angled opposed relation from said side legs; and
(c) resilient spring finger members respectively on opposite sides of said U-shaped portion, said finger members having anchored ends on said arms, and deflectable free ends extending toward the U-shaped portion between said legs.

3. An article mounting bracket, comprising:
(a) a strap member formed to provide a U-shaped portion having spaced side legs interconnected by a bridging portion;
(b) integral arm portions respectively formed by the strap projecting in right angled opposed relation from said side legs; and
(c) resilient spring finger members respectively on opposite sides of said U-shaped portion, each of said finger members having one end portion connected to one of said arms and its other end extending toward the U-shaped portion between said legs and being free for limited deflection.

4. An article mounting bracket, comprising:
(a) a strap member formed to provide a U-shaped portion having spaced side legs interconnected by a bridging portion;
(b) integral arm portions respectively formed by the strap projecting in right angled opposed relation from said side legs;
(c) resilient deflectable spring finger members respectively on opposite sides of said U-shaped portion, each of said finger members having one end portion connected to one of said arms and its other end extending toward the U-shaped portion between said legs; and
(d) a slot in said other end for the passage of the associated leg of the U-portion for limiting the deflection movement of the finger.

5. An article mounting bracket, comprising:
(a) a strap member formed to provide a U-shaped portion having spaced side legs interconnected by a bridging portion;
(b) integral arm portions respectively formed by the strap projecting in right angled opposed relation from said side legs;
(c) resilient spring finger members respectively on opposite sides of said U-shaped portion, each of said finger members being V-shaped to provide angularly extending finger parts, one of said parts being anchored to one of said arms, and the other part being deflectable and having an end portion extending toward the U-shaped portion between said legs; and
(d) a transverse slot in the latter of said parts for the passage of the adjacent leg of the U-portion to permit limited deflecting movement of the finger part.

6. A bracket for removably mounting an article on a channel-like member, comprising:
(a) a strap member formed to provide a U-shaped portion having spaced side legs interconnected by a bridging portion, said U-shaped portion being adapted to receive the channel-like member therein through the space between its side legs;
(b) integral arm portions respectively formed by the strap projecting in right angled opposed relation from said side legs; and
(c) resilient spring finger members on opposite sides of said U-shaped portion, each said finger members being V-shaped and having one end anchored to one of said arms, its other end being deflectable and extending toward the U-shaped portion between said legs and having a hooked end terminus for engaging a leg edge of a channel-like member positioned in said U-shaped portion.

References Cited in the file of this patent

UNITED STATES PATENTS

| | | |
|---|---|---|
| 1,533,731 | Foley | Apr. 14, 1925 |
| 1,997,756 | Stamy | Apr. 16, 1935 |
| 2,249,895 | Hall | July 22, 1941 |
| 2,445,606 | Davis | July 20, 1948 |
| 2,658,247 | Heuer | Nov. 10, 1953 |
| 3,056,412 | Wolfe | Oct. 2, 1962 |